United States Patent
Scharpf et al.

(10) Patent No.: US 6,739,675 B1
(45) Date of Patent: May 25, 2004

(54) BRAKE EFFORT MONITOR

(75) Inventors: Robert N. Scharpf, Greer, SC (US); David E. Schweikert, Moore, SC (US); James T. Dewberry, Moore, SC (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 0 days.

(21) Appl. No.: 10/339,813

(22) Filed: Jan. 10, 2003

(51) Int. Cl.$^7$ .................................................. B60T 13/00
(52) U.S. Cl. ........................... 303/7; 303/152; 188/159; 318/371
(58) Field of Search ........................... 303/3, 7, 15, 16, 303/20, 135, 152, 154, 155, 167; 188/158, 159, 160, 161, 164, 181 A, 181 C; 318/371, 375, 376, 379, 372

(56) References Cited

U.S. PATENT DOCUMENTS 4,225,813 A * 9/1980 Sahasrabudhe ............. 318/371
5,975,649 A * 11/1999 Maruta et al. ................. 303/7
6,441,573 B1 * 8/2002 Zuber et al. ................. 318/375

* cited by examiner

Primary Examiner—Douglas C. Butler
Assistant Examiner—Xuan Lan Nguyen
(74) Attorney, Agent, or Firm—James Ray & Associates

(57) ABSTRACT

A brake effort monitor for railcar braking systems includes means connected to receive a brake effort request signal and a vehicle speed signal for generating an energy requested signal. Another device is connected to receive a brake effort actual signal and a vehicle speed signal for generating an actual energy signal. There is a mechanism connected to receive the energy requested signal and add it to one of a previous energy requested signal and a predetermined value for generating an energy requested sum signal. A device is connected to receive the actual energy signal and add it to one of a previous actual energy signal and a predetermined value for generating an actual energy sum signal. A comparator is connected to receive the energy requested sum signal and the actual energy sum signal for generating a performance comparison signal and a storage device is connected to receive at least one of an energy requested sum signal and an actual energy sum signal and a performance comparison signal for storing at least one signal.

24 Claims, 2 Drawing Sheets

BRAKE EFFORT MONITOR

FIELD OF THE INVENTION

The present invention generally relates to a brake effort monitor software logic program in a microprocessor system. More particularly, the invention relates to a brake effort monitor software logic program in a microprocessor system designed to maximize dynamic brake effort and evaluate dynamic and friction braking systems for optimal braking performance in a transit vehicle and the total blended brake monitoring optimization of dynamic and friction brake systems.

BACKGROUND OF THE INVENTION

There is presently known in the prior art, typically on transit vehicles, the use of a combination of dynamic braking and friction braking to bring the transit vehicle to a stop. It is advantageous to use dynamic braking preferentially over friction braking because dynamic braking is "free" or actually saves money. The reason being is that there are no wearing parts involved with dynamic braking and when regenerative brake is used, which is basically electricity generated by the vehicle that can be used by other vehicles, thereby producing an overall energy savings. On the other hand, friction braking causes wear of the brake shoes or pads and also requires energy to produce the air or hydraulic pressure required to generate the braking forces.

Typically on transit vehicles in the prior art, the dynamic brake and the friction brake are controlled independently, and the amount of braking for each brake system is not monitored during normal operation. The dynamic brake system operates with no information regarding the operation of the friction brake system.

Therefore, when dynamic brake is not fully utilized, operation costs increase. If the combined brake system is not performing as designed, the resultant wear in over friction braking can be costly. Under braking of the dynamic effort results in higher friction brake wear. Under braking in the entire brake system can result in longer stop distances than required. Over braking on dynamic braking or friction braking can result in increased system wear and possible wheel/rail damage due to higher brake rates. Over braking may cause wheel slide or locking conditions which could result in longer stop distances than required.

SUMMARY OF THE INVENTION

In one aspect, the present invention provides a brake effort monitor for railcar braking systems. The brake effort monitor includes a means connected to receive a brake effort request signal and a vehicle speed signal for generating an energy requested signal. There is a means connected to receive a brake effort actual signal and the vehicle speed signal for generating an actual energy signal. A means is connected to receive an energy requested signal and add it to one of a previous energy requested signal and a predetermined value for generating an energy requested sum signal. The brake effort monitor of the present invention also includes a means connected to receive an actual energy signal and add it to one of a previous actual energy signal and a predetermined value for generating an actual energy sum signal. A comparison means is connected to receive an energy requested sum signal and an actual energy sum signal for generating a performance comparison signal. Finally, the brake effort monitor of the present invention further includes a storage means connected to receive at least one of an energy requested sum signal and an actual energy sum signal and a performance comparison signal for storing at least one of these signals.

In another aspect, the present invention provides a method for monitoring brake effort of railcar braking systems. The method for monitoring brake effort includes the following steps.

Communicating a vehicle speed signal to at least one of a means for calculating energy requested and a means for calculating actual energy. Communicating a brake effort request signal to a device for calculating energy requested and communicating a brake effort actual signal to a means for calculating actual energy.

Then, an energy requested signal is calculated using the brake effort requested and vehicle speed signals communicated in the prior steps and a predetermined time period. Next, an actual energy signal is calculated using the brake effort actual and vehicle speed signals previously communicated and a predetermined time period.

Further, the method includes communicating the energy requested signal calculated to a means for calculating an energy requested sum. It also includes communicating the actual energy signal calculated to a means for calculating an actual energy sum.

There is calculated an actual energy sum signal using the actual energy signal communicated and one of a previously communicated actual energy sum signal and a predetermined value in absence of a previously communicated actual energy sum signal. Further, the present invention calculates an energy requested sum signal using the energy requested signal communicated and one of a previously communicated energy requested sum signal and a predetermined value in absence of a previously communicated energy requested sum signal.

Next, the method includes communicating the energy requested sum signal calculated and the actual energy sum signal calculated to a means for calculating a performance comparison. Then calculation of a performance comparison signal using the energy requested sum signal communicated and the actual energy sum signal communicated is performed. Included in the method is communication of at least one of a energy requested sum signal calculated and a actual energy sum signal calculated and a performance comparison signal calculated to a means for storing at least one signal. Finally, the present invention stores at least one of an energy requested sum signal communicated and an actual energy sum signal communicated and a performance comparison signal calculated.

OBJECTS OF THE INVENTION

It is, therefore, one of the primary objects of the present invention to provide a brake effort monitor which uses a software logic based program to monitor transit vehicle brake effort amounts.

Another object of the present invention is to provide a brake effort monitor which uses a software logic based program for storing in memory the monitored requested and actual brake effort amounts with a time and date stamp.

Yet another object of the present invention is to provide a brake effort monitor which uses a software logic based program for comparing the performance factor of dynamic braking and friction braking to optimize total transit vehicle braking.

Still another object of the present invention is to provide a brake effort monitor which uses a software logic based program data to ensure the dynamic braking usage is maximized and translates into cost savings over time.

Yet another object of the present invention is to provide a brake effort monitor which uses a software logic based program for monitoring the performance of Total Brake Effort (Actual Effort/Requested Effort).

A further object of the present invention is to provide a brake effort monitor which uses a software logic based program for monitoring actual dynamic (electric) brake effort supplied over time.

Still another object of the present invention is to provide a brake effort monitor which uses a software logic based program for monitoring actual friction brake effort supplied over time.

A still further object of the present invention is to provide a brake effort monitor which uses a software logic based program for monitoring total dynamic and friction brake effort supplied over time.

Still another object of the present invention is to provide a brake effort monitor which uses a software logic based program for evaluating the performance of a brake system using actual energy supplied and the requested energy supplied.

Although a number of objects and advantages of the present invention have been described in some detail above, various additional objects and advantages of the software logic based program for the brake effort monitor of the present invention will become more readily apparent to those persons who are skilled in the art from the following more detailed description of the invention, particularly, when such detailed description of the invention is taken in conjunction with both the attached drawing figures and with the appended claims.

DETAILED DESCRIPTION OF A PRESENTLY PREFERRED EMBODIMENT OF THE INVENTION

Figure 1:
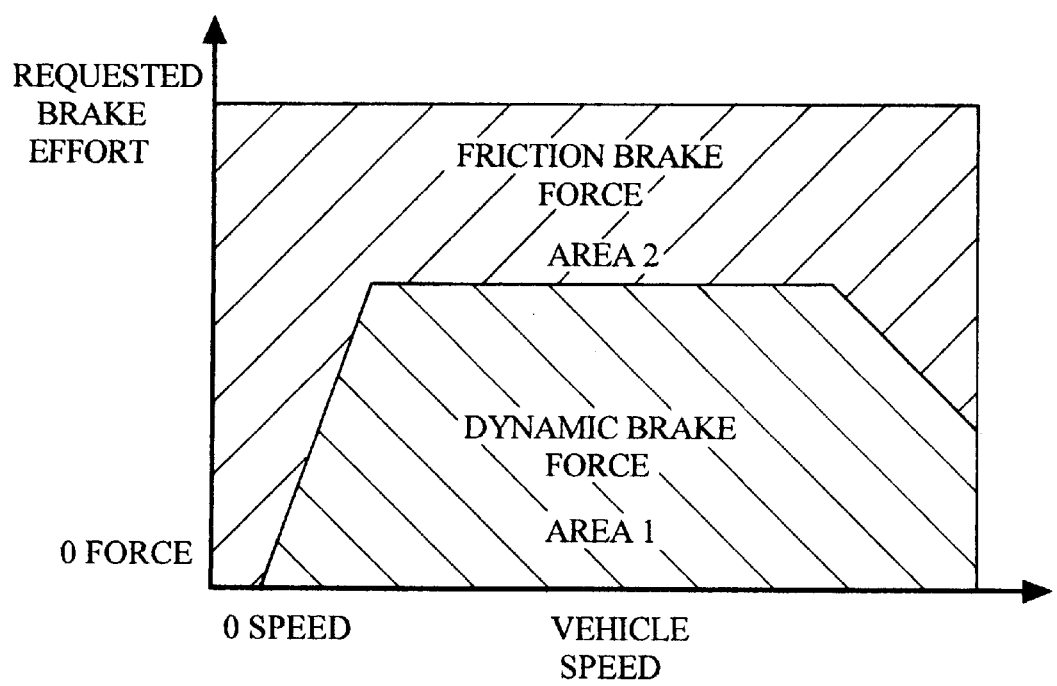
FIG. 1 is a graphic illustration of a Transit Brake Utilization indicating the relative areas of interest with regard to blended brake and brake optimization, starting at zero for requested brake effort and vehicle speed, along with dynamic brake force designated in Area 1 and friction brake force designated in Area 2 within this view.
Figure 2:
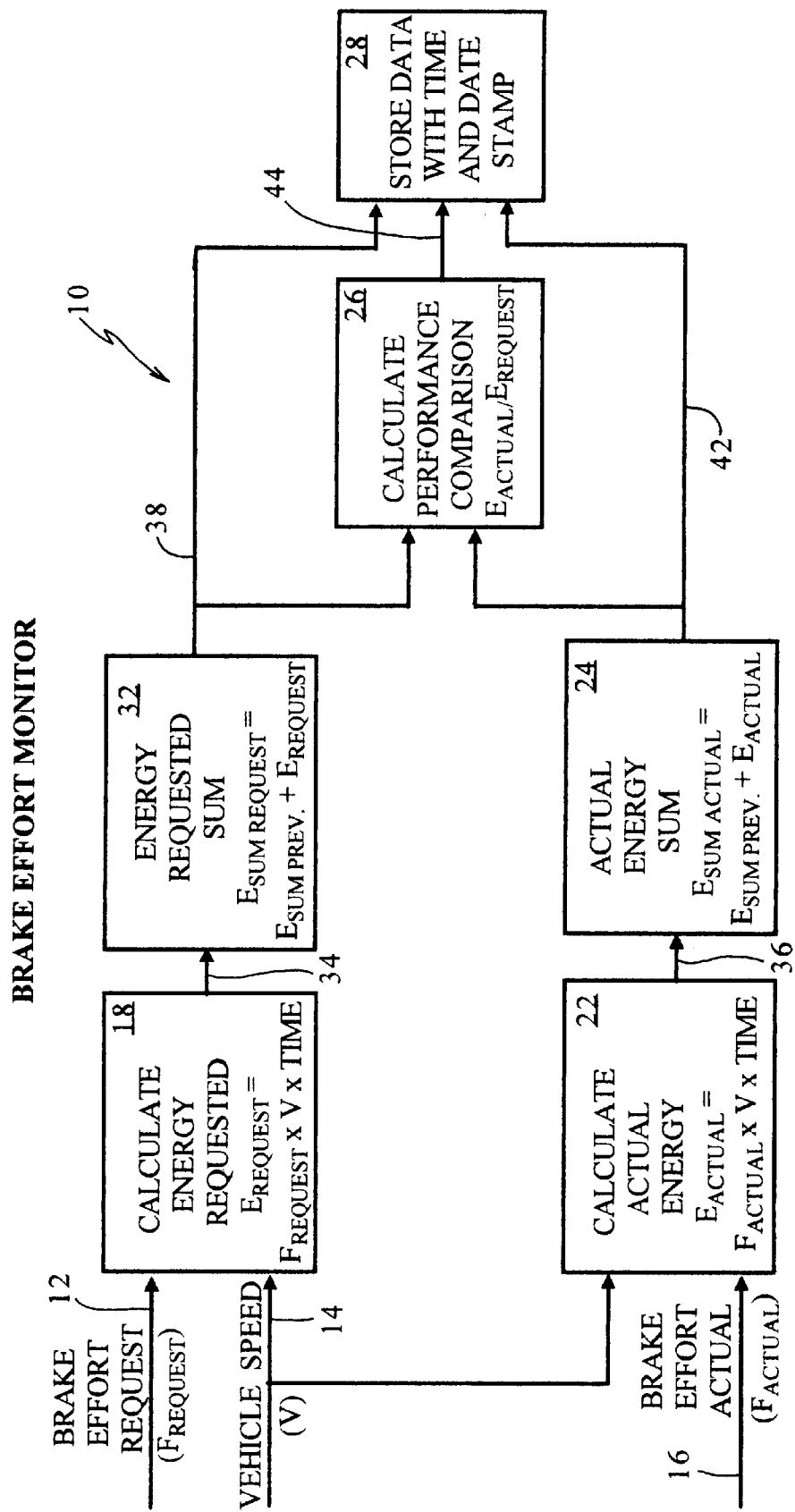
FIG. 2 is a block drawing showing a presently preferred embodiment of a software logic based program designated for a typical transit vehicle Brake Effort Monitor Logic system.

Referring initially to FIG. 2 there is illustrated a presently preferred embodiment of a brake effort monitoring apparatus constructed according to the present invention generally indicated by reference numeral 10. In order for the brake effort monitor 10 to operate as intended it requires a brake effort required signal 12, a vehicle speed signal 14, and a brake effort actual signal 16 to be provided by any convenient source (not shown).

In a presently preferred configuration, the brake effort monitor communicates the vehicle speed signal 14 to at least one of a means 18 for calculating energy requested and a means 22 for calculating actual energy. The brake effort request signal 12 is communicated to a means 18 for calculating energy requested. An energy requested signal 34 is calculated using the vehicle speed signal 14 and the brake effort requested signal 12 communicated and a predetermined time period. This signal 34 is calculated by multiplying the brake effort requested signal 12 and the vehicle speed signal 14 and a predetermined time period. Then, the energy requested signal 34 calculated is communicated to a means 32 for calculating an energy requested sum.

The brake effort actual signal 16 is communicated to a means 22 for calculating actual energy. An actual energy signal 36 is calculated using the vehicle speed signal 14 and the brake effort actual signal 16 communicated and a predetermined time period. This signal 36 is calculated by multiplying the brake effort actual signal 16 and the vehicle speed signal 14 and a predetermined time period. Then, the actual energy signal 36 calculated is communicated to a means 24 for calculating an actual energy sum.

An actual energy sum signal 42 is calculated by adding the actual energy signal 36 communicated to one of a previously communicated actual energy sum signal and a predetermined value in absence of a previously communicated actual energy sum signal.

An energy requested sum signal 38 is calculated by adding the energy requested signal 34 communicated to one of a previously communicated energy requested sum signal and a predetermined value in absence of a previously communicated energy requested sum signal.

The energy requested sum signal 38 and the actual energy sum signal 42 are then communicated to a means 26 for calculating a performance comparison. A performance comparison signal 44 is calculated using the energy requested sum signal communicated and the actual energy sum signal communicated. The performance comparison signal 44 is calculated by dividing the actual energy sum signal 42 by the energy requested sum signal 38. A performance comparison signal 44 with a value less than 1.00 would indicate that actual brake rate was less that the requested brake rate. A performance comparison signal 44 with a value of greater than 1.00 would indicate that the actual braking force applied was greater than the brake rate requested. A performance comparison signal 44 value not equal to 1.00 may indicate equipment malfunction, implementation issues, or design issues for the braking equipment.

At least one of the energy requested sum signal 38 and the actual energy sum signal 42 and the performance comparison signal 44 are communicated to a means 28 for storing data with a time and date stamp.

According to the present invention the brake effort request signal is at least one of a friction brake effort request signal and a dynamic brake effort request signal and a total brake effort request signal. In this embodiment, preferably the total brake effort request signal is equal to the friction brake effort request signal plus the dynamic brake effort request signal.

The brake effort actual signal, in this embodiment is at least one of a friction brake effort actual signal and a dynamic brake effort actual signal and a total brake effort actual signal and the total brake effort actual signal is equal to the friction brake effort actual signal plus such dynamic brake effort actual signal.

At least one of the energy requested sum signal 38 and the actual energy sum signal 42 and the performance comparison signal 44 are then combined with a time and date stamp and stored in a means 28 for storing data with a time and date stamp.

While the present invention has been described by way of a detailed description of a particularly preferred embodiment, it will be readily apparent to those of ordinary skill in the art that various substitutions of equivalents may be affected without departing from the spirit or scope of the inventions set forth in the appended claims.

We claim:

1. A brake effort monitor for railcar braking systems, said brake effort monitor comprising:
   (a) a means connected to receive a brake effort request signal and a vehicle speed signal for generating an energy requested signal;
   (b) a means connected to receive a brake effort actual signal and said vehicle speed signal for generating an actual energy signal;
   (c) a means connected to receive said energy requested signal and add it to one of a previous energy requested sum signal and a predetermined value for generating an energy requested sum signal;
   (d) a means connected to receive said actual energy signal and add it to one of a previous actual energy sum signal and a predetermined value for generating an actual energy sum signal;
   (e) a comparison means connected to receive said energy requested sum signal and said actual energy sum signal for generating a performance comparison signal; and
   (f) a storage means connected to receive at least one of said energy requested sum signal and said actual energy sum signal and said performance comparison signal for storing said at least one signal.

2. A brake effort monitor for railcar braking systems according to claim 1, wherein said storage means further includes a means for adding a time and date stamp to said at least one signal stored in said storage means.

3. A brake effort monitor for railcar braking systems according to claim 1, wherein said energy requested signal is generated by multiplying said brake effort request signal and said vehicle speed signal and a predetermined time period.

4. A brake effort monitor for railcar braking systems according to claim 1, wherein said actual energy signal is generated by multiplying said brake effort actual signal and said vehicle speed signal and a predetermined time period.

5. A brake effort monitor for railcar braking systems according to claim 1, wherein said performance comparison signal is generated by dividing said actual energy sum by said energy requested sum.

6. A brake effort monitor for railcar braking systems according to claim 1, wherein said brake effort request signal is at least one of a friction brake effort request signal and a dynamic brake effort request signal and a total brake effort request signal.

7. A brake effort monitor for railcar braking systems according to claim 6, wherein said total brake effort request signal is equal to said friction brake effort request signal plus said dynamic brake effort request signal.

8. A brake effort monitor for railcar braking systems according to claim 1, wherein said brake effort actual signal is at least one of a friction brake effort actual signal and a dynamic brake effort actual signal and a total brake effort actual signal.

9. A brake effort monitor for railcar braking systems according to claim 8, wherein said total brake effort actual signal is equal to said friction brake effort actual signal plus said dynamic brake effort actual signal.

10. A brake effort monitor for railcar braking systems according to claim 1, wherein said v storage means is connected to receive at least two of said energy requested sum signal and said actual energy sum signal and said performance comparison signal for storing said at least two signals.

11. A brake effort monitor for railcar braking systems according to claim 10, wherein said storage means further includes a means for adding a time and date stamp to said at least two signals.

12. A brake effort monitor for railcar braking systems according to claim 1, wherein said storage means is connected to receive each of said energy requested sum signal and said actual energy sum signal and said performance comparison signal for storing said each signal.

13. A brake effort monitor for railcar braking systems according to claim 12, wherein said storage means further includes a means for adding a time and date stamp to said each signal.

14. A method for monitoring brake effort of railcar braking systems, said method for monitoring brake effort comprising the steps of:
   (a) communicating a vehicle speed signal to at least one of a means for calculating energy requested and a means for calculating actual energy;
   (b) communicating a brake effort request signal to said means for calculating energy requested;
   (c) communicating a brake effort actual signal to said means for calculating actual energy;
   (d) calculating an energy requested signal using said signals communicated in steps (a) and (b) and a predetermined time period;
   (e) calculating an actual energy signal using said signals communicated in steps (a) and (c) and a predetermined time period;
   (f) communicating said energy requested signal calculated in step (d) to a means for calculating an energy requested sum;
   (g) communicating said actual energy signal calculated in step (e) to a means for calculating an actual energy sun;
   (h) calculating an actual energy sum signal using said signal communicated in step (g) and one of a previously communicated actual energy sum signal and a predetermined value in absence of a previously communicated actual energy sum signal;
   (i) calculating an energy requested sum signal using said signal communicated in step (f) and one of a previously communicated energy requested sum signal and a predetermined value in absence of a previously communicated energy requested sum signal;
   (j) communicating said energy requested sum signal calculated in step (i) and said actual energy sum signal calculated in step (h) to a means for calculating a performance comparison; and
   (k) calculating a performance comparison signal using said energy requested sum signal communicated in step (j) and said actual energy sum signal communicated in step (j);
   (l) communicating at least one of said energy requested sum signal calculated in step (i) and said actual energy sum signal calculated in step (h) and said performance comparison signal calculated in step (k) to a means for storing said at least one signal;
   (m) storing at least one of said energy requested sum signal communicated in step (l) and said actual energy sum signal communicated in step (l) and said performance comparison signal calculated in step (l).

15. A method for monitoring brake effort of railcar braking systems according to claim 14, wherein said method for monitoring brake effort includes an additional step of multiplying said brake effort request signal and said vehicle speed signal and a predetermined time period to calculate said energy requested signal in step (d).

16. A method for monitoring brake effort of railcar braking systems according to claim 14, wherein said method for monitoring brake effort includes an additional step of multiplying said brake effort actual signal and said vehicle speed signal and a predetermined time period to calculate said actual energy signal in step (e).

17. A method for monitoring brake effort of railcar braking systems according to claim 14, wherein said method for monitoring brake effort includes an additional step of adding an energy requested signal to one of a previous energy requested sum signal and a predetermined value in the absence of a said previous energy requested sum signal to calculate said energy requested sum signal in step (i).

18. A method for monitoring brake effort of railcar braking systems according to claim 14, wherein said method for monitoring brake effort includes an additional step of adding an actual energy signal to one of a previous actual energy sum signal and a predetermined value in the absence of said previous actual energy sum signal to calculate said actual energy sum signal in step (h).

19. A method for monitoring brake effort of railcar braking systems according to claim 14, wherein said method for monitoring brake effort includes an additional step of dividing said actual energy sum signal by said energy requested sum signal for calculating a performance comparison signal in step (k).

20. A method for monitoring brake effort of railcar braking systems according to claim 14, said method for monitoring brake effort includes an additional step of adding a time and date stamp to said at least one signal stored in step (m).

21. A method for monitoring brake effort of railcar braking systems according to claim 14, said method for monitoring brake effort includes an additional step of storing at least two of said energy requested sum signal and said actual energy sum signal and said performance comparison signal.

22. A method for monitoring brake effort of railcar braking systems according to claim 21, said method for monitoring brake effort includes adding a time and date stamp to said at least two signals.

23. A method for monitoring brake effort of railcar braking systems according to claim 14, said method for monitoring brake effort includes an additional step of storing each of said energy requested sum signal and said actual energy sum signal and said performance comparison signal.

24. A method for monitoring brake effort of railcar braking systems according to claim 23, said method for monitoring brake effort includes adding a time and date stamp to said each signal.

* * * * *